United States Patent

[11] 3,566,837

| [72] | Inventor | John H. Denham |
| | | Route 1, Weir, Kans. 66781 |
| [21] | Appl. No. | 819,827 |
| [22] | Filed | Apr. 28, 1969 |
| [45] | Patented | Mar. 2, 1971 |

[54] CHINCHILLA DUST BATH APPARATUS
5 Claims, 3 Drawing Figs.

[52] U.S. Cl. .................................................. 119/1, 43/131, 119/17
[51] Int. Cl. ............................................... A01k 67/00
[50] Field of Search .......................................... 119/18, 52, 22, 53, 51, 1, 19, 48, 159; 43/131

[56] References Cited
UNITED STATES PATENTS

| 489,589 | 1/1893 | Lewis | 119/53 |
| 545,673 | 9/1895 | Burke | 119/53 |
| 2,532,681 | 12/1950 | Stover | 43/131 |
| 2,653,569 | 9/1953 | Forester | 119/18 |
| 2,944,364 | 7/1960 | Kelly | 43/131 |
| 2,964,871 | 12/1960 | Hoffman | 43/131 |
| 3,087,458 | 4/1963 | Bennett, Jr. | 119/17 |
| 3,125,068 | 3/1964 | Hampton, Jr. | 119/17 |
| 3,225,738 | 12/1965 | Palencia | 119/17 |
| 3,254,627 | 6/1966 | Cross | 119/17 |

*Primary Examiner*—Aldrich F. Medbery
*Attorney*—Fishburn, Gold and Litman

ABSTRACT: Dust bath apparatus comprises a boxlike structure mounted in an elevated position and includes a hopper for containing bath dust which empties through a low slot into a trough, the trough opening into an adjacent animal chamber having a sloping floor with a discharge opening at the lowermost portion.

PATENTED MAR 2 1971
3,566,837
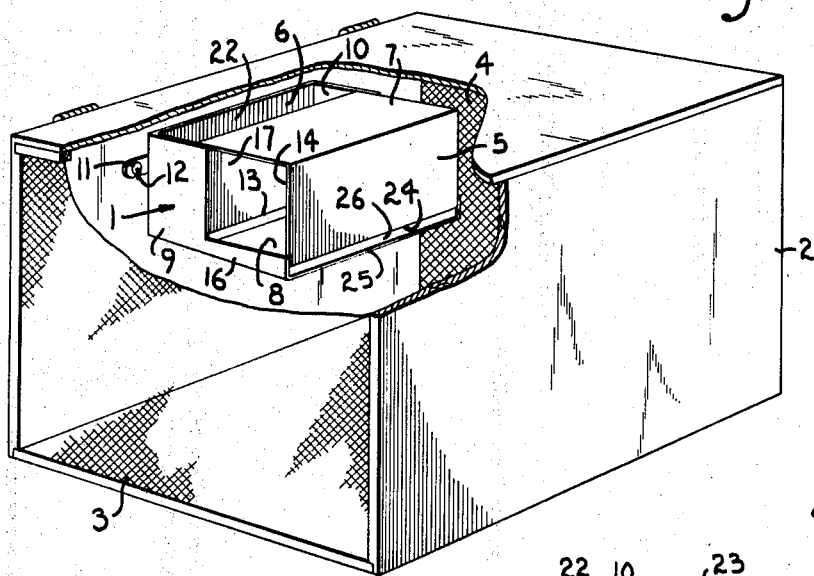
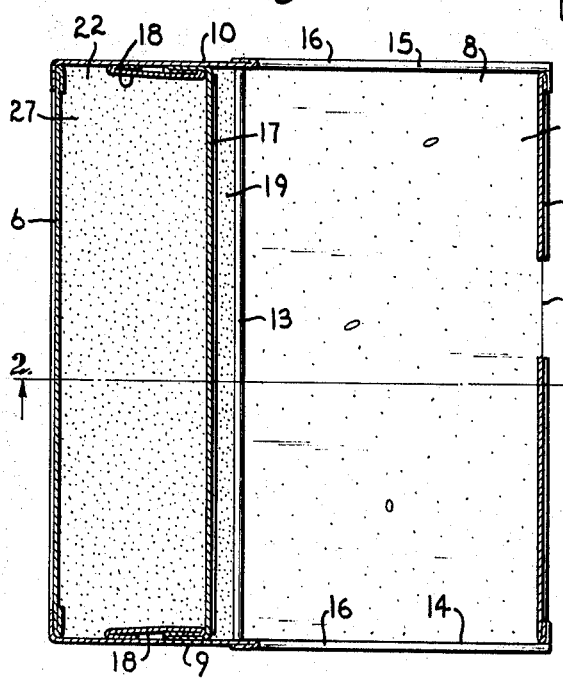
INVENTOR.
John H. Denham
BY
Fishburn, Gold & Litman
ATTORNEYS

CHINCHILLA DUST BATH APPARATUS This invention relates to the art of raising small, fur-bearing animals for their pelts, and more particularly to improved dust bath apparatus for use by such animals.

One of the special problems encountered in raising small, fur-bearing animals, such as chinchillas, is the necessity of maintaining the fur in good condition while the animals mature in confinement. Many such animals, in their natural habitat, groom themselves by rolling in dust and spreading it throughout the fur where it acts as a smoothing and cleaning agent. Fur ranchers have noted this, and in recent years have supplied prepared dust to the animals, which they readily use. The prepared dust has generally consisted of pulverized pumice, volcanic ash, fullers earth or the like and sometimes suitable chemicals added as an aid to destroy fungus or the like and help preserve fur quality. Heretofore, with chinchillas, the dust was supplied to an individual cage, normally containing a female, in a small, open pan and left on the floor a few minutes while the animal took its bath. The pan was then lifted out of the cage and placed in the next cage, and so on, until the entire herd was satisfied. This was not only a time-consuming operation, but required that the dust in the pan be changed frequently to avoid spreading soil and possible disease.

This invention contemplates a boxlike structure substantially permanently mounted in an elevated position within each cage and so constructed that fresh dust is continuously available to the animal as desired, and soiled dust is automatically ejected. Further, the interior of the box makes a convenient hiding area where a female may retreat from an overly agressive male which normally has access into the cage.

The principal objects of the present invention are: to provide improved dust bath apparatus for small, fur-bearing animals, such as chinchillas; to provide such apparatus which makes a supply of clean dust continuously available to the animal; to provide such dust bath structure which tends to maintain itself in a clean condition so as to avoid fur staining from accumulated litter; to provide such structure which forms a convenient hiding place for the animal; and to provide such a construction which is inexpensive to build, easily installed, permits a considerable saving in time and effort, and is well suited for its intended purpose.

Other objects and advantages of this invention will become apparent from the following description taken in connection with the accompanying drawings wherein are set forth by way of illustration and example certain embodiments of this invention.

FIG. 1 is a perspective view of a chinchilla cage with a portion broken away showing dust bath apparatus embodying this invention mounted within the cage on a wall thereof.

FIG. 2 is a cross-sectional side elevation through the apparatus taken on the line 2-2, FIG. 3, showing the interior thereof.

FIG. 3 is a cross-sectional plan view through the apparatus taken on line 3-3, FIG. 2, showing further details thereof.

Referring to the drawings in more detail:

The reference numeral 1 generally indicates dust bath apparatus embodying this invention. The apparatus 1 is shown, by way of illustration, within a cage 2 having walls of wood with the exception of the end walls 3 and 4 which are of suitable wire cloth or screen. The apparatus 1 comprises a boxlike structure preferably of a nonchewable, easily formable material, such as galvanized sheet metal. The structure has spaced apart front and rear walls 5 and 6, top and bottom walls 7 and 8 and sidewalls 9 and 10 all spaced apart to form a container as described below.

The rear wall 6, in this example, has suitable ears 11 projecting laterally therefrom and adapted to receive screws 12 secured in a vertical wall of the cage 2 for supporting the apparatus 1 in an elevated position above the cage floor, FIG. 1.

The bottom wall 8 slopes downwardly as it extends forwardly from the rear wall 6, as best illustrated in FIG. 2, and a riser 13 projects upwardly from the bottom wall 8 a small portion of the distance between said bottom wall 8 and the top wall 7. The riser 13, in this example, extends across the entire width of said apparatus 1, that is, into engagement with the sidewalls 9 and 10, FIG. 3. The sidewalls 9 and 10 have a relatively large, aligned, rectangular, animal receiving openings 14 and 15 therethrough which have the bottom edges thereof spaced slightly above the bottom wall 8, thereby forming ledges 16. The rear edges of the openings 14 and 15 are positioned slightly forwardly of the riser 13, FIG. 2.

A vertical adjusting plate 17 extends between the sidewalls 9 and 10 and is mounted for vertical sliding motion upon suitable aligned guide clips 18 secured to the interior surfaces of the sidewalls 9 and 10 in opposed positions. The adjusting plate 17 is held forwardly of the rear wall 6 by the guide clips 18 and parallel to and spaced closely rearwardly of the riser 13 forming an upwardly open trough 19 therebetween. The vertical adjustability of the plate 17 permits the raising and lowering of the plate lower edge 20 with respect to the bottom wall 8 forming a variable height slot 21. The sidewalls 9 and 10, rear wall 6 and adjusting plate 17 thus form a rectangular bin or hopper 22 opening at the bottom thereof into the trough 19 through the slot 21. The top wall 7 has a relatively large opening 23 at the rear portion thereof and over the hopper 22 providing convenient top access for the hopper.

The front wall 5 has a bottom edge 24 spaced above the front edge 25 of the bottom wall 8 forming a discharge slot 26 extending the width of the apparatus, as best shown in FIG. 1.

In use, the dust material 27 is placed into the hopper 22 through the opening 23 to a substantial depth and a portion enters the trough 19 through the slot 21. Due to the physical characteristics of the dust, the level in the trough 19 does not normally exceed the height of the riser 13. The animal (not shown) easily propels itself into the chamber 28 formed between the adjusting plate 17 and the front wall 5. The animal enters and exits through either of the openings 14 and 15 and while in the chamber 28 has easy access to the dust in the trough 19. The animal generally scoops the dust with its front paws onto the floor and its body and then rolls around on the floor exposing all parts to the dust treatment. Due to the sloping condition of the bottom wall 8, used dust and litter move downwardly toward the front of the apparatus under the vibrations caused by the motion of the animal and gradually discharge through the slot 26 into the cage where it is frequently removed along with the usual litter created. The ledges 16 prevent dust from falling out the sides of the apparatus, tending to avoid waste. Further, the chamber 28 provides a convenient retreat or hiding place which may be used by the female in avoiding an overly aggressive male having access to the cage.

As the dust is scooped out from the trough 19, it is automatically replaced by clean dust from the hopper 22 through the slot 21 and the adjustability of the plate 17 permits compensation for the varying flow characteristics of different dust compositions which may be used.

It is to be understood that although one form of this invention has been illustrated and described it is not to be limited specifically thereto.

I claim:

1. Dust bath apparatus for small, fur-bearing animals comprising:
    a. a boxlike structure, means on said structure for securing same in an elevated position, means forming an animal receiving chamber within said structure, means forming a hopper in said structure for receiving and storing dust,
    b. means forming a dispensing member in said structure and opening within said chamber, means providing a flow passageway between said hopper and said dispensing member for maintaining dust in said dispensing member,
    c. said structure including a bottom wall for supporting the animal when in said chamber, said bottom wall sloping downwardly away from said dispensing member at an angle sufficient to move dust and litter away from said dispensing member under vibrations caused by the motion of the animal, and d. means forming a discharge opening in said structure and communicating along the lowest edge of said bottom wall for discharging litter on said bottom wall.

2. The apparatus as set forth in claim 1 wherein:
a. said means forming a flow passageway is adjustable to vary the size of said flow passageway.

3. The apparatus as set forth in claim 2 wherein:
a. said structure includes spaced apart front, rear, top, bottom and sidewalls, and
b. said means forming a flow passageway comprises a vertical plate extending between and adjustably mounted for vertical movement on said sidewalls and positioned forwardly of said rear wall.

4. Dust bath apparatus comprising:
a. a boxlike structure having spaced apart front, rear, top, bottom and side walls, said bottom wall sloping downwardly as it projects forwardly from said rear wall, riser projecting upwardly from said bottom wall between said front and rear walls, said sidewalls having an animal receiving opening spaced forwardly of said riser,
b. a vertical plate extending between and mounted on said sidewalls forwardly of said rear wall, said plate being positioned parallel to and spaced closely rearwardly of said riser forming an upwardly open trough therebetween, said sidewalls, rear wall and plate forming a rectangular hopper, said hopper opening at the bottom thereof into said trough through a slot formed between the lower edge of said plate and said bottom wall, and
c. said front wall having a bottom edge spaced above the front edge of said bottom wall forming a discharge slot, said bottom wall slope being sufficient to move dust and litter through said discharge slot under vibrations caused by motion from an animal in said apparatus.

5. The apparatus as set forth in claim 4 including;
a. means on one of said walls for securing said structure in an elevated position.